No. 690,190. Patented Dec. 31, 1901.
VICENTE PAZOS Y SACIO.
APPARATUS FOR TREATING GOLD ORES.
(Application filed Nov. 8, 1900.)
(No Model.)
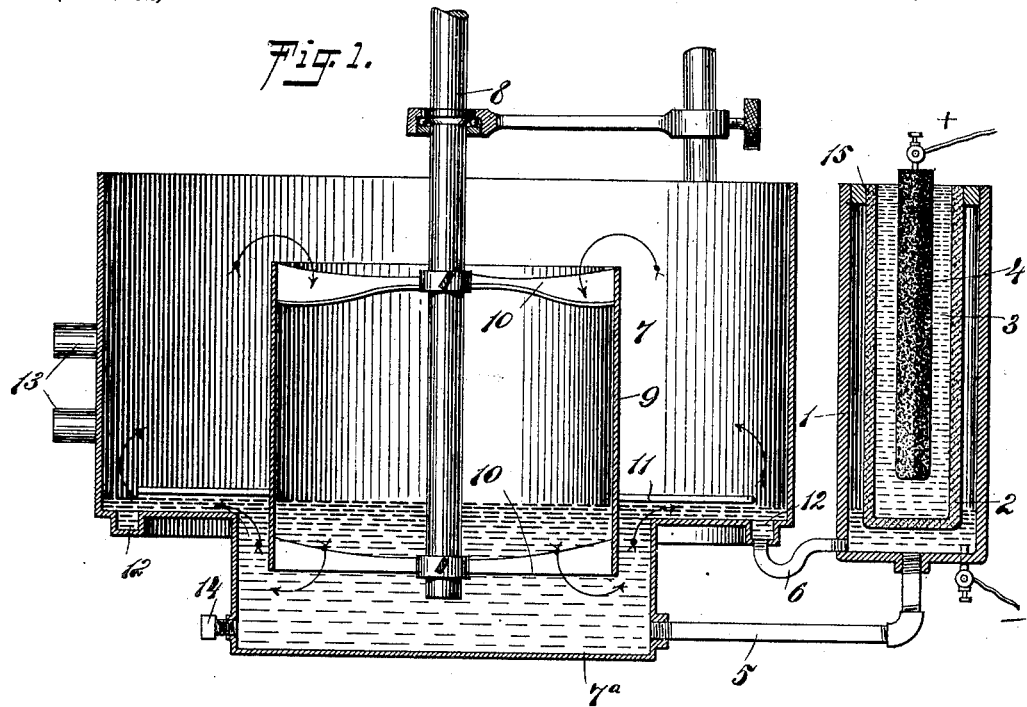
Fig. 1.
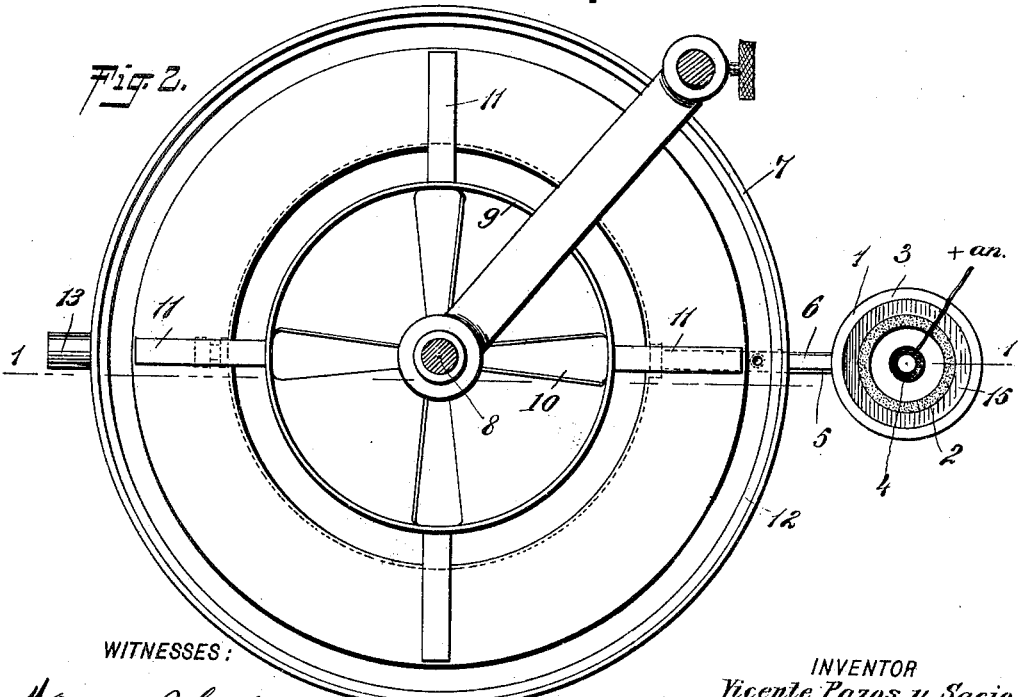
Fig. 2.
WITNESSES:
William P. Goebel.
John Lotka.
INVENTOR
Vicente Pazos y Sacio.
BY 
ATTORNEYS

UNITED STATES PATENT OFFICE.

VICENTE PAZOS Y SACIO, OF YAULI, PERU.

APPARATUS FOR TREATING GOLD ORES.

SPECIFICATION forming part of Letters Patent No. 690,190, dated December 31, 1901.

Application filed November 8, 1900. Serial No. 35,836. (No model.)

*To all whom it may concern:*

Be it known that I, VICENTE PAZOS Y SACIO, a citizen of Peru, and a resident of Yauli Tuctu, Peru, have invented a new and Improved Apparatus for Treating Gold Ores, of which the following is a full, clear, and exact description.

My invention relates to the treatment of gold ores, and has for its object to provide a simple and efficient apparatus for extracting gold from its ores upon a large scale, with the advantage of a regeneration of the chemicals used.

The invention will be fully described hereinafter and the features of novelty pointed out in the appended claims.

Reference is to be had to the accompanying drawings, forming a part of this specification, in which similar characters of reference indicate corresponding parts in both the figures.

Figure 1 is a sectional elevation on the line 1 1 of Fig. 2 of an apparatus for carrying out my invention, and Fig. 2 is a plan of the apparatus.

The apparatus comprises two parts, forming communicating vessels, one of which has an exterior shell 1, which may itself be of conducting material, or a conducting lining may be provided for the lower part of this vessel. Within this vessel is suspended a porous cell 2, held at the top by a filling 15 to produce an air-tight joint. The porous cell 2 contains the electrolyte 3 and the anode 4, which may be of carbon. The vessel 1 communicates with another vessel, 7, by two pipes 5 6, terminating at different levels of the vessel 7. This latter has a wide upper portion and a narrow lower portion $7^a$. The bottom of the upper portion has an annular groove or channel 12 adjacent to its periphery. Further, the receptacle is provided with an opening for the discharge of mercury, which opening is located in the narrow part $7^a$ and is normally closed by a plug 14. In the upper part of the receptacle are located ore-discharge holes 13. Centrally within the receptacle is disposed a shaft 8, which may be adjusted vertically and dips into the lower section $7^a$ of the receptacle. This shaft carries arms 10, curved somewhat after the fashion of propeller-blades, and to the outer ends of these arms is secured a cylinder 9, from which stirrer-rods 11 project outwardly at a distance from the bottom.

In operation the porous cell is filled with a salt of potassium or sodium—for instance, common salt, (NaCl)—and mercury is filled into the receptacle 7 to about the level of the stirrers 11, it being understood that the mercury will stand at practically the same level in the vessel 1. The gold ore is finely ground and mixed with enough water to make a thin pulp, which is fed into the receptacle 7 to a level about four to six inches above the upper arms 10. It will be understood that the mercury is connected with one pole (the negative pole) of a source of electricity, while the carbon 4 forms the anode. The water added to the ore should contain a suitable amount of cyanid of potassium—say about one-fifth per cent. of the weight of the water. The current is then turned on and the shaft 8 rotated, and the following reactions take place: The electrolyte 3 is decomposed, (about three volts is the potential required for common salt,) forming sodium amalgam (or potassium amalgam) by combining with the mercury, while the other product of the decomposition (in this case chlorin) may be allowed to escape or may be forced into the pulp. The blades 10, which dip into the pulp, are so located that when the shaft rotates they will force the pulp downward, causing it to circulate as indicated by the arrows. Part of the gold will be dissolved by the cyanid, and the coarse gold which is not so dissolved will upon coming in contact with the sodium amalgam become cleaned and upon then passing into the mercury will become amalgamated thereby. The passage of the electric current assists amalgamation. Furthermore, some of the sodium combines with water, forming hydrated oxid of sodium (NaOH) according to the equation $2H_2O + 2Na = 2NaOH + H_2$. This hydrated sodium oxid (caustic alkali) materially assists the dissolving action of the cyanid.

The gold is dissolved by the cyanid according to the equation: $2Au + 4KCy + O + H_2O = 2KAuCy_2 + 2KOH$. This gold solution comes in contact with the sodium amalgam previously mentioned, and the result is that the sodium of the amalgam takes the place of the gold in the double salt $KAuCy_2$ and the sodium combines with the cyanogen, forming sodium cyanid, the properties and uses of which are practically the same as those of potassium cyanid, so that virtually a regeneration of the solvent is obtained. This may be expressed by the equation $2KAuCy_2 + 2NaHg = 2KCy2NaCy + 2AuHg$, showing that at the same time gold amalgam is formed. The reactions develop considerable heat, which, together with the agitation, contributes to hasten the completion of the process.

Having thus described my invention, I claim as new and desire to secure by Letters Patent—

1. An apparatus for treating ores, comprising a receptacle having a wide upper portion with an annular collecting-channel in its bottom, and a reduced lower portion, a stirrer extending into both portions of the receptacle, an electrolytic vessel or cell, and passages leading from said vessel to the lower part of the reduced portion of the receptacle and to the said collecting-channel respectively.

2. An apparatus for treating ores, comprising a receptacle for holding mercury and the ores of precious metals, an electrolytic vessel adjacent to said receptacle, separate pipes connecting said receptacle and said vessel at different levels, and stirrers located in substantially the same plane as one of said pipes for the purpose of causing free circulation of liquid through said electrolytic vessel.

3. An apparatus for treating ores, comprising a receptacle for holding mercury and the ores, an electrolytic vessel adjacent to said receptacle and communicating therewith, a porous cup located in said vessel, an annular plug fitting air-tight between said porous cup and said vessel containing the same, separate electrolytic fluids in said porous cup and said vessel respectively, and electrodes located in said porous cup and said electrolytic vessel.

In testimony whereof I have signed my name to this specification in the presence of two subscribing witnesses.

VICENTE PAZOS Y SACIO.

Witnesses:
  A. DERASSI,
  W. S. MCBRIDE.